US010620024B2

(12) United States Patent
Voigt

(10) Patent No.: US 10,620,024 B2
(45) Date of Patent: Apr. 14, 2020

(54) MAGNETO-INDUCTIVE FLOW MEASURING DEVICE HAVING A SUPPORT TUBE WITH STRUCTURE TO PREVENT ROTARY MOVEMENT OF THE LINER

(71) Applicant: Endress + Hauser Flowtec AG, Reinach (CH)

(72) Inventor: Frank Voigt, Weil am Rhein (DE)

(73) Assignee: ENDRESS + HAUSER FLOWTEC AG, Reinach (CH)

( * ) Notice: Subject to any disclaimer, the term of this patent is extended or adjusted under 35 U.S.C. 154(b) by 151 days.

(21) Appl. No.: 15/567,269

(22) PCT Filed: Apr. 25, 2016

(86) PCT No.: PCT/EP2016/059141
§ 371 (c)(1),
(2) Date: Oct. 17, 2017

(87) PCT Pub. No.: WO2016/177594
PCT Pub. Date: Nov. 10, 2016

(65) Prior Publication Data
US 2018/0156649 A1 Jun. 7, 2018

(30) Foreign Application Priority Data
May 7, 2015 (DE) .......................... 10 2015 107 119

(51) Int. Cl.
*G01F 1/58* (2006.01)
*G01F 15/14* (2006.01)

(52) U.S. Cl.
CPC ............... *G01F 1/588* (2013.01); *G01F 1/58* (2013.01); *G01F 15/14* (2013.01)

(58) Field of Classification Search
None
See application file for complete search history.

(56) References Cited

U.S. PATENT DOCUMENTS

| 3,465,585 | A | 9/1969 | Wada |
| 5,280,727 | A | 1/1994 | Hafner et al. |
| 6,817,249 | B2 * | 11/2004 | Yamazaki ............... G01F 1/588 73/861.12 |
| 7,895,902 | B2 * | 3/2011 | Iijima ....................... G01F 1/58 73/861.11 |

(Continued)

FOREIGN PATENT DOCUMENTS

| CN | 2669143 Y | 1/2005 |
| CN | 10 1103255 A | 1/2008 |

(Continued)

OTHER PUBLICATIONS

German Search Report, German PTO, Munich, dated Jan. 18, 2016.

(Continued)

*Primary Examiner* — Harshad R Patel
(74) *Attorney, Agent, or Firm* — Bacon & Thomas, PLLC

(57) ABSTRACT

A measuring tube for a magneto-inductive flow measuring device, comprising a support tube and a liner arranged in the support tube wherein the support tube has on its inner surface a surface structure, which prevents a rotary movement of the liner in the measuring tube, and a magneto-inductive flow measuring device with such a measuring tube.

15 Claims, 3 Drawing Sheets

(56) References Cited

U.S. PATENT DOCUMENTS

| | | | |
|---|---|---|---|
| 2008/0196510 A1* | 8/2008 | Nielsen | G01F 1/58 73/861.12 |
| 2009/0178489 A1 | 7/2009 | Iijima | |
| 2010/0294044 A1* | 11/2010 | Iijima | G01F 1/58 73/861.11 |
| 2012/0304780 A1* | 12/2012 | Walbrecker | G01F 1/58 73/861.12 |
| 2013/0145861 A1* | 6/2013 | Neven | G01F 1/584 73/861.12 |
| 2014/0033826 A1* | 2/2014 | Reichart | G01F 1/60 73/861.12 |
| 2014/0053658 A1* | 2/2014 | Neven | G01F 1/588 73/861.12 |
| 2014/0260661 A1* | 9/2014 | Smith | G01F 1/584 73/861.12 |
| 2015/0300851 A1* | 10/2015 | Isik-Uppenkamp | G01F 1/584 73/861.12 |
| 2016/0084689 A1* | 3/2016 | Smith | G01F 1/588 73/861.12 |
| 2016/0195416 A1* | 7/2016 | Iijima | G01F 1/584 73/861.12 |

FOREIGN PATENT DOCUMENTS

| | | |
|---|---|---|
| DE | 32 01 562 A1 | 8/1983 |
| DE | 103 58 268 A1 | 7/2005 |
| DE | 10 2008 054 961 A1 | 7/2010 |
| DE | 10 2010 020 768 A1 | 11/2010 |
| DE | 10 2013 114 428 A1 | 6/2015 |
| DE | 10 2015 107 119 A1 | 11/2016 |
| GB | 2 047 409 A | 11/1980 |
| JP | 57-88321 A | 6/1982 |
| JP | 61-22216 A | 1/1986 |
| JP | S62-35224 A | 2/1987 |
| JP | 2002048612 A | 2/2002 |
| WO | 2010/069867 A1 | 6/2010 |
| WO | 2015/090760 A1 | 6/2015 |
| WO | 2016/177594 A1 | 11/2016 |

OTHER PUBLICATIONS

International Search Report, EPO, The Netherlands, dated Jul. 21, 2016.
Office Action dated Apr. 23, 2019, in corresponding Chinese Application No. 2016-80026156.4.

\* cited by examiner

MAGNETO-INDUCTIVE FLOW MEASURING DEVICE HAVING A SUPPORT TUBE WITH STRUCTURE TO PREVENT ROTARY MOVEMENT OF THE LINER

TECHNICAL FIELD

The present invention relates to a measuring tube for a magneto-inductive flow measuring device and to a magneto-inductive flow measuring device

BACKGROUND DISCUSSION

In the case of measuring tubes for magneto-inductive flow measuring devices, measuring tubes of plastic are known, but, for the most part, measuring tubes with a support tube of metal, especially steel, are used. In the latter case, however, there is the problem that the material of the measuring tube is conductive. In order, nevertheless, to be able to tap a voltage from the measuring electrodes, the measuring tube must be electrically insulated. For this, usually an insulating, plastic layer, a so called liner, is used. The adhesion of such materials to the metal surface is, however, not optimal. Additionally, the liner can under process conditions be mechanically deformed Therefore, a perforated sheet is applied, which serves the liner material as support body. This support body is inserted in the support tube and supports the liner material. The German patent, DE 10 2008 054 961 A1 of the applicant discloses a number of possible embodiments of such a perforated sheet, one possibility being a sheet which is perforated only segment-wise.

A major theme is the anchoring of the liner in the support tube. One method of securement is described in the aforementioned German patent, DE 10 2008 054 961. In such case, the support body is affixed in the measuring tube by a press-fit, so that the support body is secured in the support tube only due to the accompanying compression, however, without any bonding of the materials.

This variant has basically proved itself as a practical and cost effective variant, which can be put into practice in production relatively easily. However, over longer periods of time, the compressive stress of the perforated sheet can lessen and the liner can turn in the measuring tube.

Another option of anchoring is described in German patent, DE 10 2006 018 415 A1. Involved in this case is a support body composed of two half shells, which can be manufactured in the form of perforated sheets. These are secured to the measuring tube terminally via material bonds using weld pads.

The welding of a perforated sheet has the disadvantage that, most often, only little space is left between the perforated sheet and the support tube for the cast liner material to enter. Also, temperature differences between perforated sheet and support tube can due to thermal expansion differences lead over long periods of operation to failure of the weld locations.

A grid for support of a liner is additionally shown in U.S. Pat. No. 5,773,723 A1 and US Patent 2008/0196510 A1 likewise shows in a support tube a support body embodied as a perforated sheet or grid. The function of a support is also described in these embodiments. As indicated by the figures, these support bodies have, however, no anchoring to the support tube, but, instead, are embedded in the liner without anchoring.

German Patent, DE 10 2013 11 444 284 A1 discloses, additionally, a measuring tube, in which an internal thread is present. Terminal screw thread formations on a support body engage in this internal thread. The support body can be affixed in the measuring tube through screwing, or twisting, in. Twist prevention is provided by two sockets, which engage terminally with the support body.

In the case of poly-fluorinated plastic liners, it is known that only extremely weak adhesive bonds form with the support measuring tube. An undesired twisting of the liner in the measuring tube in the case of longer use is, consequently, probable, the more so, since no additional securements of the liner are provided.

An alternative to perforated sheet is described in European Patent, EP 1 039 269 A1. In such case, a sintered material is distributed flushly in the support tube and forms a tubular support body, which extends almost completely over the inner surface of the support tube. Due to the open pored structure of the sinter material, the liner material can penetrate and anchor. The sintering offers an especially good bonding of the supporting sinter material to the steel support tube.

The sintered material is, however, comparatively expensive and additionally complex to implement.

SUMMARY OF THE INVENTION

Starting from the above described state of the art, an object of the present invention is to provide a measuring tube for a magneto-inductive flow measuring device, wherein an alternative, cost effective and more reliable anchoring of a liner in the support tube is implemented.

The present invention achieves this object by a measuring tube claim and by a magneto-inductive flow measuring device as defined in claim 10.

A measuring tube of the invention suitable for a magneto-inductive flow measuring device includes a support tube and a liner arranged in the support tube. Usually, the support tube is composed of a metal, preferably a non-ferromagnetic, stainless steel. As is known, the liner serves for electrical insulation between the measured medium and the metal support tube.

The inner surface of the support tube is structured to prevent rotary movement of the liner in the measuring tube. A surface structure, which prevents rotary movement of the liner in the measuring tube, can, in a preferred embodiment, be grooves. It is, however, also possible, to provide a knurling, a scaled structure or an irregular structure. The embodiment as grooves, preferably grooves extending parallel to the measuring tube axis, is cost-efficiently implementable and prevents a twisting of the liner especially reliably.

German Patent, DE 10 2013 11 444 284 A1 discloses an internal thread, which is, however, not suitable for preventing a rotary movement of the liner. Only by interaction with an annular stop, which, however, is not part of the support tube, is a rotary movement prevented.

It is possible to provide the surface structure by an insert in the support tube. This can be manufactured of metal and can be welded to the support tube. It is, however, advantageous for reasons of reliability that the surface structure be formed integrally of the material of the support tube.

The surface structure can especially be composed of grooves. These can preferably have a depth of at least one tenth of the tube wall thickness. The grooves are advantageously distributed symmetrically over the entire periphery of a section of the support tube, so that the force distribution for preventing rotation is as uniform as possible. In a less preferred embodiment, the surface structure can also comprise only one groove. To the extent that a number of sections along the tube axis have a surface structure of the invention, which are advantageously embodied as grooves extending in the longitudinal direction of the measuring tube axis, the symmetric distribution of these grooves around the periphery can vary from section to section.

The surface structure of the support tube can advantageously be formed by a deformation method, preferably by a cold working method, especially by a swaging method. This is advantageous compared with chip removing methods, since the tube wall is not weakened in the region of the surface structure. Exactly swaging as a special form of cold working has proved to be an especially favorable manufacturing method for tubular elements, since no temperature related tempering colors or weakening of the material of the support tube result.

In order to avoid a linear displacement of the liner in the support tube and to assure a good adhesion of the liner to the support tube surface, it is advantageous that the support tube have symmetric, encircling bulges of the tube wall, wherein the inner surface of the support tube is essentially wetted with the liner material.

Arranged within the support tube is preferably a support body, preferably a hollow cylindrical support body, which is embedded in the liner. This support body increases the mechanical strength of the liner, so that such also lies better against the surface structure. The support body is, in such case, preferably formed of a perforated sheet.

The aforementioned support body can likewise be formed by a deformation method, preferably by cold working, especially by a swaging method. The advantages achieved thereby are similar to those achieved in the case of the support tube. Especially preferably, the aforementioned method can be applied in the case of tapered support bodies, thus support bodies, which have a cross sectional narrowing in the region of the measuring electrodes.

A magneto-inductive flow measuring device of the invention includes a measuring tube of the invention, as well as a magnet system and at least two measuring electrodes arranged on the or in the measuring tube.

Advantageously arranged within the support tube is a support body, preferably the above-described hollow-cylindrical support body, which is embedded in the liner and which has a reduced cross section in the region of the measuring electrodes, so that a flow conditioning can be achieved.

A magneto-inductive flow measuring device of the invention is provided with a measuring tube of the invention.

BRIEF DESCRIPTION OF THE DRAWINGS

In the following, the subject matter of the invention will now be explained in greater detail based on examples of embodiments illustrated in the appended drawing, the figures of which show as follows.

DETAILED DISCUSSION IN CONJUNCTION WITH THE DRAWINGS

Figure 1:
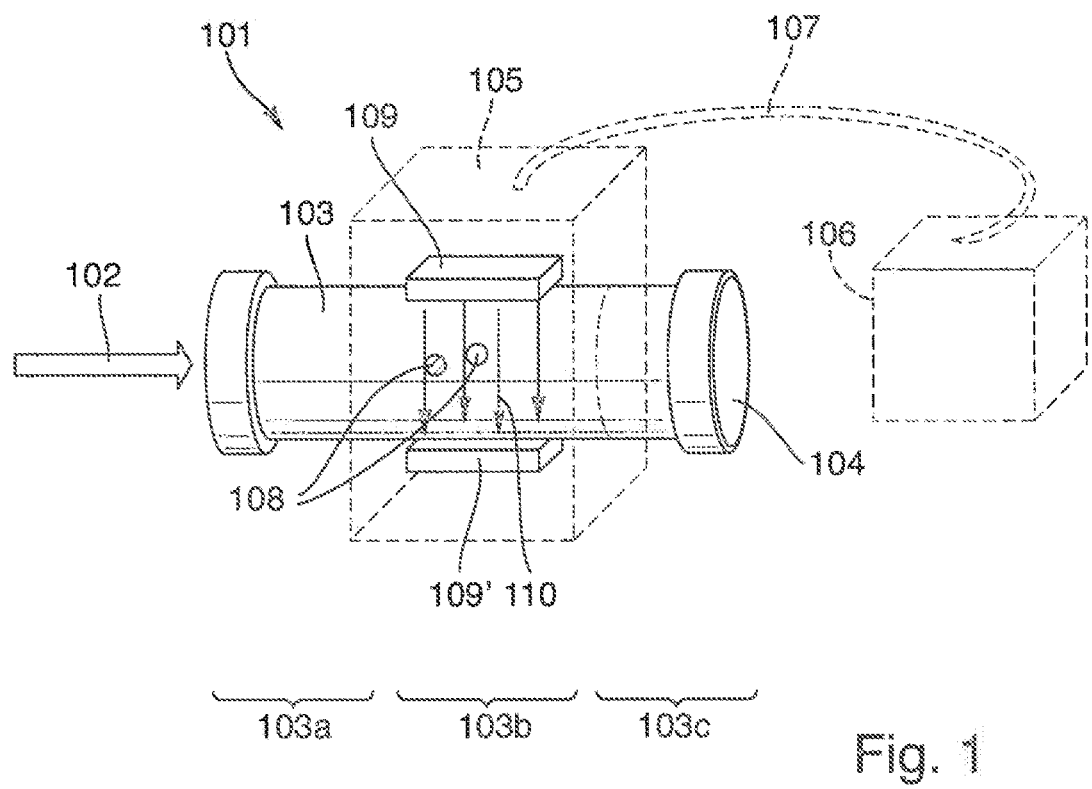
FIG. 1 is a schematic view of a magneto-inductive flow measuring device according to the state of the art.
Figure 2:
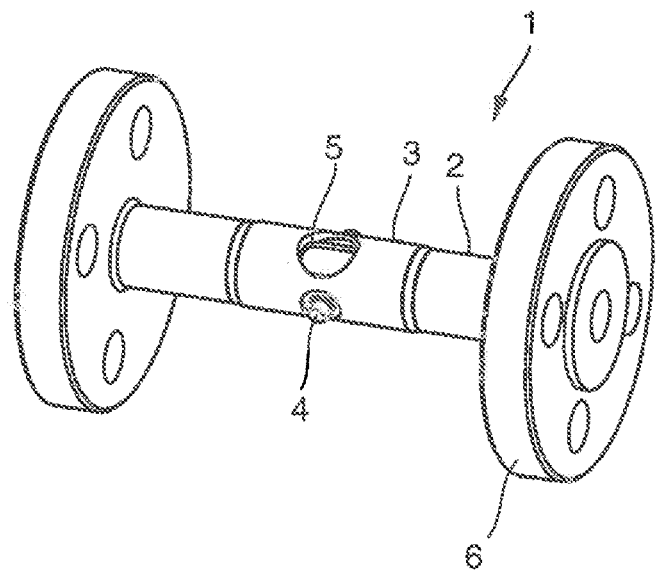
FIG. 2 is a perspective view of a first embodiment of a measuring tube of the invention for a magneto-inductive flow measuring device.
Figure 3:
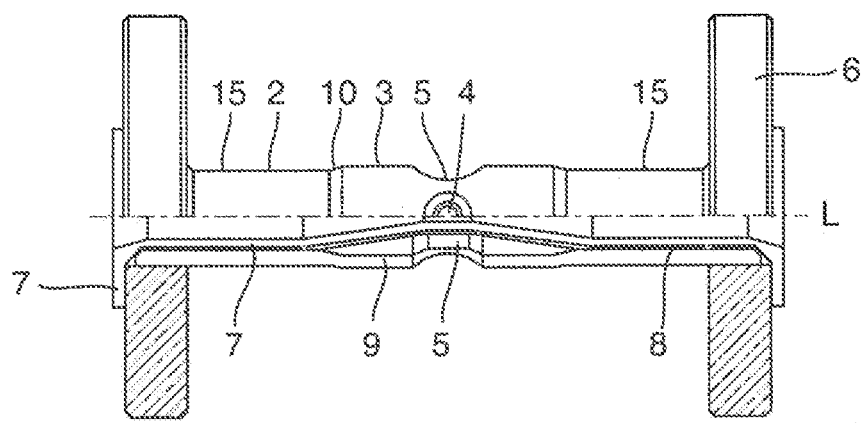
FIG. 3 is a sectional view of the measuring tube of FIG. 2 with liner.
Figure 4:
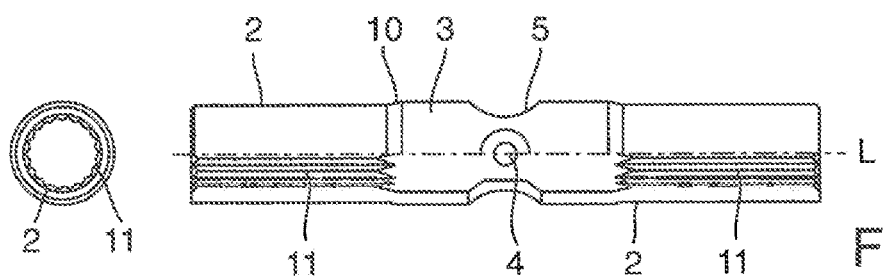
FIG. 4 is a detail view of the measuring tube of FIG. 2.
Figures 4A, 5:
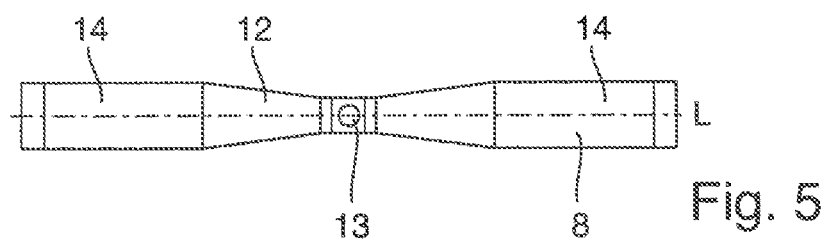
FIG. 4a is a end view of FIG. 4.
FIG. 5 is a sectional view of the support body to be arranged in the measuring tube of FIG. 2.
Figure 6:
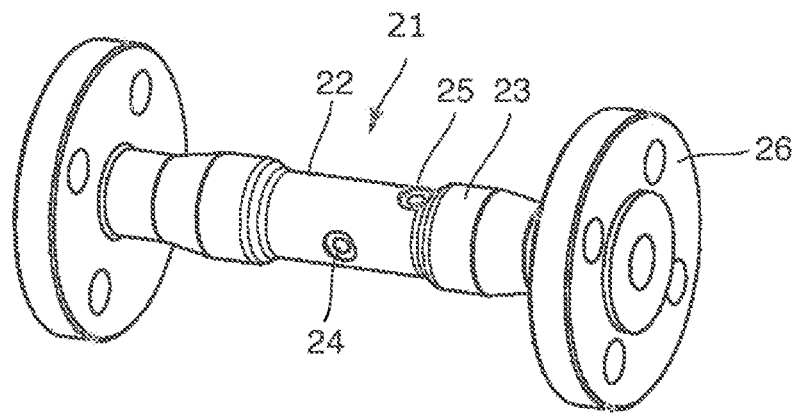
FIG. 6 is a perspective view of a second embodiment of a measuring tube of the invention.
Figure 7:
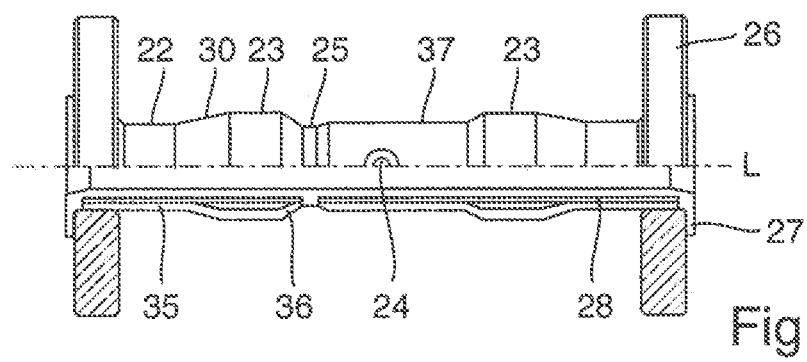
FIG. 7 is a sectional view of the measuring tube of FIG. 6 with liner.
Figure 8:
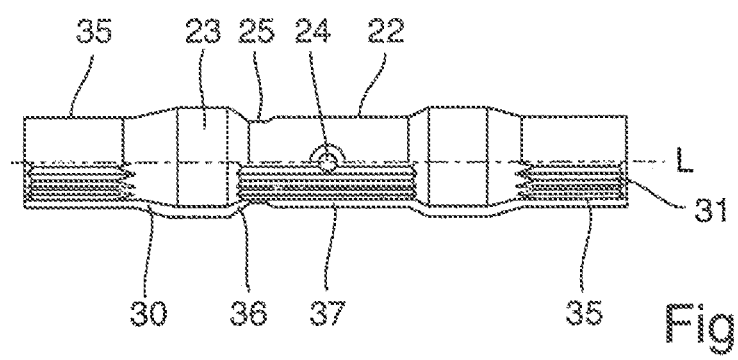
FIG. 8 is a detail view of the measuring tube of FIG. 6.
Figure 9:
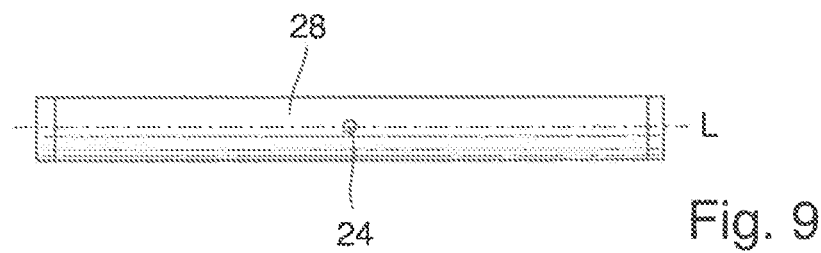
FIG. 9 is a sectional view of the support body to be arranged in the measuring tube of FIG. 6.

The construction and the measuring principle of a magneto-inductive flow measuring device are basically known and schematically shown by way of example in FIG. 1. According to Faraday's law of induction, a voltage is induced in a conductor moved in a magnetic field. In the case of the magneto-inductive measuring principle, flowing measured medium corresponds to the moved conductor, which flows with a flow velocity v through a measuring tube. A magnetic field B with constant strength is produced by a magnet system, e.g. by two field coils, arranged on the two sides of a measuring tube. Located perpendicularly thereto on the tube inner surface of the measuring tube are two measuring electrodes, which tap the voltage $U_e$ produced in the case of flow of the measured medium through the measuring tube. The induced voltage $U_e$ is proportional to the flow velocity v of the measured medium and therewith to the volume flow Q, which can be calculated by an evaluation unit. The magnetic field B of the magnet system is produced by a clocked, direct current of electrical current level I and changing polarity. This assures a stable zero-point and makes the measuring insensitive to influences of multiphase materials, inhomogeneity in the liquid or smaller conductivity. Known also are magneto-inductive flow measuring devices with coil arrangements with more than two field coils and other geometrical arrangements.

FIG. 1 shows a magneto-inductive flow measuring device 101 for measuring the flow of a flowing fluid 102 through a measuring tube 103, such as known from the state of the art. Measuring tube 103 is provided over its total length in the region facing the fluid, i.e. on the inside, with an electrically insulating liner 104. It is helpful for purpose of discussion to subdivide the measuring tube 103 into an inlet section 103a, a measuring section 103b, where a sensor unit is located, and an outflow section 103c. Shown for the sensor unit are a measuring electrode pair 108 for tapping the induced voltage, as well as a magnet system, which, for simplified illustration, is shown as two boxes. The magnet system includes at least two coils 109, 109' for producing the magnetic field 110 and, in given cases, also pole shoes for implementing an advantageous spatial distribution and/or field guiding sheet metal pieces. The connecting axes of the measuring electrode pair 108 and the field coils 109 extend perpendicularly to one another, wherein the two field coils and the two measuring electrodes 108 are, in each case, positioned on oppositely lying sides of the measuring tube 103.

The sensor unit with its respective components, such as the measuring electrode pair 108 and the magnet system, is usually at least partially surrounded by a housing 105. In the housing 105 or in the present case outside of the housing 105, an electronics unit 106 is additionally provided, which is electrically connected with the field device 101 via a connecting cable 107. The electronics unit serves for signal registration and/or evaluation and for supplying power to the coils, as well as for providing an interface to the environment, e.g. for measured value output or for input of settings to the device.

The liner arranged in the measuring tube can, however, for various reasons, loosen and/or move relative to the inner surface of the measuring tube.

Particularly when one considers that the measuring device must assure a reliable measurement operation over the course of many years, the anchoring of the liner is of great importance.

It has been found that a perforated sheet or a sheet of expanded metal is helpful for this. Perforated sheet variants for liner anchoring are known from the state of the art in various types and embodiments. In the case of perforated sheets, the openings are punched out, while, in contrast, in the case of expanded metal sheets, protrusions are pressed out by machine. Also their securement variants in the measuring tube, e.g. by press-fit, via weld pads and by other mutually engaging, screwed connection with the measuring tube, have been discussed in the state of the art and in as yet unpublished patent applications.

FIGS. 2-9 show two alternative variants for the securement of a support body for keeping a liner in a measuring tube.

FIGS. 2-5 show a first embodiment of a measuring tube 1 of the invention for a magneto-inductive measuring device with terminal flanges 6. Measuring tube 1 includes a support tube 2. The support tube has, in the regions of the inlet- and outlet sections of the measuring tube, tube sections 15 with constant and equal circumferences.

In the measuring section, in which the magnet system and the measuring electrodes are provided, the support tube 2 includes a tube section in the form of a uniformly circumferentially distributed bulge 3 with a greater tube circumference. Additionally, the measuring electrodes 4 are already integrated in the measuring tube. The measuring tube, especially the support tube of the measuring tube, includes, moreover, receptacles 5 for a magnet system and, in given cases, also a pole shoe mount.

Arranged in the support tube 2 is a support body 8, preferably one of hollow cylindrical shape, especially a hollow cylindrical, perforated sheet, which is encased by a liner 7. Support body 8 includes in the measuring section a cross sectional narrowing 12 compared with the inlet- and outlet regions 14 of the support body, for improved flow conditioning and for lessening the inlet path. Located in this region are also holes 13 in the support body 8, through which the measuring electrodes 4 pass. Liner material is likewise arranged in a chamber 9 of the region between the cross sectional narrowing 12 of the support body 8 and the tube wall of the measuring tube 1.

Between the tube section 15 and the tube section 3, the support tube 2 has a circumferential step 10. In the region of the step, an increase or a decrease, preferably a continuous increase or decrease, of the tube outer circumference occurs, depending on the direction of travel along the axis of the tube. This is also a tapering. The tube section 3 with a greater tube outer circumference blocks a shifting of the liner in the axial direction, since such a shifting is prevented by the step 10.

A twist-preventer of the liner is likewise provided in the support tube. For this, circumferentially distributed grooves 11 are provided on the inner surface of the support tube 2, as introduced into the inner surface. Of concern is an integral arrangement within the measuring tube. The course of the grooves 11 is preferably parallel to the longitudinal axis L of the measuring tube 1. The liner material can during manufacture e.g. flow into these grooves and harden. A twisting of the liner within the measuring tube is then not possible because of the grooves. The grooves are especially arranged in one or in both tube sections 15 of the inlet and/or of the outlet.

FIGS. 6-9 show a second embodiment of a measuring tube 21 of the invention for a magneto-inductive measuring device, comprising a support tube 22 and terminal flanges 26. Support tube 22 includes in the regions of the inlet- and outlet sections of the measuring tube 21 tube sections 35 of constant and equal tube outer circumferences.

Provided in the measuring section, in which the magnet system and the measuring electrodes are arranged, is a tube section 37 likewise of constant tube outer circumference. Measuring tube 21 includes additionally measuring electrodes 24 and receptacles 25 for a magnet system.

Arranged in the support tube 22 is a support body 28, preferably of hollow cylindrical shape, which is embedded in a liner 27 preferably injection molded or cast to encase the support body 28. In an especially preferred variant, the support body 28 is embodied as a hollow cylindrical, perforated sheet.

Support body 28 has a constant cross section over its length.

Support tube 22 does not have a constant cross section over the course of its longitudinal axis. In the regions of the inlet and outlet sections as well as also in the measuring section, tube sections 35 and 37 are arranged, which do have a constant circumference. Between these sections, however, annular segments 23, i.e. annular bulges, of the wall of the support tube are arranged, which have a greater circumference than the tube regions 35 and 37. The annular segments 23 have one or more regions 30, 36 with continuous increase and/or decrease of the outer circumference.

In the tube regions outside the annular segments 23, there are arranged in certain regions along the inner surface of the support tube grooves 31, which preferably extend parallel to the longitudinal axis of the measuring tube. These grooves serve as twist-preventers.

Different options are available for manufacturing support tubes as shown in FIGS. 2-5 and 6-9. Such options include casting methods, chip removing methods and deformation methods. Casting- and chip removing methods differ from deformation methods as regards the fiber, or grain, flow in a photomacrograph of a sample in the region of the surface structure provided according to the invention. The fiber flow is in the case of casting methods unchanged in the tube wall region with the surface structure compared with the remaining regions. The fiber flow in the case of chip removing methods is, in contrast, interrupted. In the case of the aforementioned deformation methods, the fiber flow is not interrupted, but the fibers are compressed, whereby a measurable strength increase of the material results compared with the undeformed material.

Casting methods for the manufacture of pipes are, most often, comparatively expensive and complex. Most often for this, the so-called lost wax casting method is utilized.

Chip removing methods, e.g. milling, would in the case of implementing the support tube lead to a considerable weakening of the tube material, whereby the stability of the measuring tube under pressure would, as a whole, be significantly lessened.

A most efficient method for manufacture of the above-described support tubes has, consequently, proved especially to be a cold deformation, or working, method, especially preferably a rotary swaging method. Support tubes are implementable therewith with the above-described outer contour and being significantly more pressure stable than comparable support tubes produced with chip removing methods.

During the swaging procedure, on the one hand, the grooves 11, 31 are formed in the support tube and at the same time, due to the driving of the material, and, in given cases, using upsetting, the bulges 3, 23 are formed. The bulges serve at the same time as an axial stop for the liner and prevent, thus, its movement in the longitudinal direction, while the grooves serve as a twist-preventer and, thus, prevent the rotation of the liner within the support tube.

Also the support body 8, 28 can be swaged for its formation. Even after the processing, the support body still has a constant wall thickness.

The liner can, in such case, be formed of materials known to be used for such purpose, especially preferably, however, of poly-fluorinated polymers, quite especially preferably PFA.

Particularly in the case of small measuring tubes with nominal diameters of less than/equal to DN15, where working the material on the tube interior is possible only with greater effort, the rotary swaging manufacturing variant enables the introduction of a twist-preventer.

The installed length of the measuring tube can be preferably less than 200 mm, especially less than 150 mm.

The support body 8, 28 can be connected in different ways with the support tube. Proved to be especially practical, however, has been securement by terminal seaming.

On the whole, the application of the aforementioned measuring tubes in magneto-inductive flow measuring devices is distinguished by a high measuring sensitivity, low component weight and a cost effective and process safe manufacture compared with other magneto-inductive flow measuring devices. Additionally, the reusability of the components in the case of incorrect manufacture is assured.

The invention claimed is:

1. A measuring tube for a magneto-inductive flow measuring device, comprising:
   a support tube; and
   a liner arranged in said support tube, wherein:
   said support tube has on its inner surface a surface structure, which prevents a rotary movement of said liner;
   wherein the surface structure comprises at least one groove, which groove extends parallel to a measuring tube axis.

2. The measuring tube as claimed in claim 1, wherein:
   said surface structure is formed of the material of said support tube.

3. The measuring tube as claimed in claim 1, wherein:
   said surface structure of said support tube is formed by a deformation method.

4. The measuring tube as claimed in claim 3, wherein:
   the surface structure of said support tube is formed by a cold working method.

5. The measuring tube as claimed in claim 1, wherein:
   said support tube has symmetric, encircling bulges of the tube wall; and
   said inner surface of said support tube is essentially wetted with the liner material.

6. The measuring tube as claimed in claim 1, wherein:
   there is arranged within said support tube a support body.

7. The measuring tube as claimed in claim 6, wherein:
   said support body is formed of a perforated sheet or expanded metal.

8. The measuring tube as claimed in claim 1, wherein:
   said support body is formed by a deformation method.

9. The measuring tube as claimed in claim 8, wherein:
   said deformation method is a cold working method.

10. The measuring tube as claimed in claim 8, wherein:
    said deformation method is a swaging method.

11. The measuring tube as claimed in claim 1, wherein:
    said surface structure comprises a plurality of grooves.

12. The measuring tube as claimed in claim 11, wherein:
    said grooves are distributed symmetrically over the entire circumference of a section of said support tube.

13. The measuring tube as claimed in claim 1, wherein:
    the surface structure of said support tube is formed by a swaging method.

14. A magneto-inductive flow measuring device, comprising:
    a measuring tube for a magneto-inductive flow measuring device, comprising: a support tube; and
    a liner arranged in said support tube, wherein: said support tube has on its inner surface a surface structure, which prevents a rotary movement of said liner, wherein:
    said flow measuring device has a magnet system and at least two measuring electrodes;
    wherein the surface structure comprises at least one groove, which groove extends parallel to a measuring tube axis.

15. The magneto-inductive flow measuring device as claimed in claim 14, wherein:
    there is arranged within said support tube a support body, which is embedded in said liner and which has a reduced cross section in the region of said measuring electrodes.

* * * * *